United States Patent
Uchiyama et al.

(10) Patent No.: US 11,670,772 B2
(45) Date of Patent: Jun. 6, 2023

(54) NEGATIVE ELECTRODE ACTIVE MATERIAL FOR LITHIUM ION BATTERY, AND LITHIUM ION BATTERY

(71) Applicant: Panasonic Intellectual Property Management Co., Ltd., Osaka (JP)

(72) Inventors: Yohei Uchiyama, Hyogo (JP); Norihisa Yamamoto, Osaka (JP); Tatsuya Akira, Osaka (JP); Kazuro Hayashida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 16/767,791

(22) PCT Filed: Oct. 26, 2018

(86) PCT No.: PCT/JP2018/039807
§ 371 (c)(1),
(2) Date: May 28, 2020

(87) PCT Pub. No.: WO2019/107032
PCT Pub. Date: Jun. 6, 2019

(65) Prior Publication Data
US 2020/0365898 A1   Nov. 19, 2020

(30) Foreign Application Priority Data

Nov. 30, 2017  (JP) .............................. JP2017-230214

(51) Int. Cl.
*H01M 4/58* (2010.01)
*H01M 10/0525* (2010.01)
(Continued)

(52) U.S. Cl.
CPC ..... *H01M 4/5825* (2013.01); *H01M 10/0525* (2013.01); *H01M 10/0568* (2013.01);
(Continued)

(58) Field of Classification Search
CPC .......... H01M 4/5825; H01M 10/0525; H01M 10/0568; H01M 10/0569; H01M 2004/021; H01M 2004/027; H01M 2004/028
See application file for complete search history.

(56) References Cited

U.S. PATENT DOCUMENTS

2013/0130101 A1* 5/2013 Kim ........................ H01M 4/38
429/188
2017/0346066 A1   11/2017 Sunano et al.
2018/0159125 A1*  6/2018 Kamimura ............ C01B 33/193

FOREIGN PATENT DOCUMENTS

| CN | 106356508 A | 1/2017 |
|----|-------------|--------|
| JP | 2011-233245 A | 11/2011 |

(Continued)

OTHER PUBLICATIONS

Mohajerani et al. (Journal of Non-Crystalline Solids. 358, 12-13, p. 1474-1479, (2012)) (Year: 2012).*

(Continued)

*Primary Examiner* — Brian R Ohara
*Assistant Examiner* — Emily Elizabeth Freeman
(74) *Attorney, Agent, or Firm* — WHDA, LLP

(57) ABSTRACT

Negative electrode active material particles according to the present invention have composite particles that include: a sodium silicate phase with a Vickers hardness of 150 Hv or greater, and silicon particles dispersed in the sodium silicate phase.

4 Claims, 1 Drawing Sheet

(51) Int. Cl.
  *H01M 10/0568* (2010.01)
  *H01M 10/0569* (2010.01)
  *H01M 4/02* (2006.01)

(52) U.S. Cl.
  CPC .. *H01M 10/0569* (2013.01); *H01M 2004/021* (2013.01); *H01M 2004/027* (2013.01); *H01M 2004/028* (2013.01)

(56) References Cited

FOREIGN PATENT DOCUMENTS

| | | | | |
|---|---|---|---|---|
| JP | 2013-161705 | A | 8/2013 | |
| JP | 2015-95301 | A | 5/2015 | |
| JP | 2016-225207 | A | 12/2016 | |
| JP | 6170795 | B2 * | 7/2017 | |
| WO | 2016/121324 | A1 | 8/2016 | |
| WO | WO-2016121325 | A1 * | 8/2016 | ............. B24B 49/00 |

OTHER PUBLICATIONS

Translation of International Search Report dated Dec. 25, 2018, issued in counterpart Application No. PCT/JP2018/039807. (2 pages).
English Translation of Chinese Search Report dated Sep. 5, 2022, issued in counterpart CN application No. 201880074559.5. (2 pages).

* cited by examiner

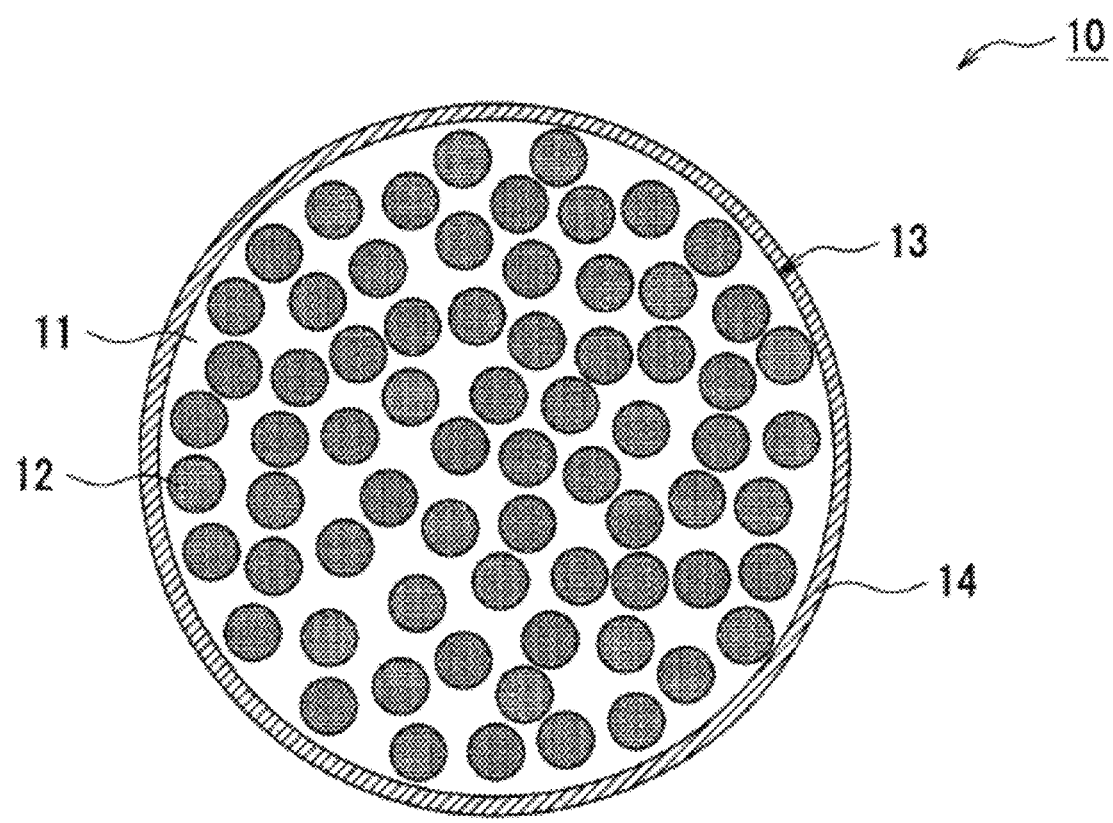

NEGATIVE ELECTRODE ACTIVE MATERIAL FOR LITHIUM ION BATTERY, AND LITHIUM ION BATTERY

TECHNICAL FIELD

The present disclosure relates to a negative electrode active material for a lithium ion battery and a lithium ion battery.

BACKGROUND ART

Silicon materials, such as silicon (Si) and silicon oxides represented by $SiO_x$, are known to intercalate more lithium ions per unit volume than carbon materials, such as graphite.

For example, Patent Literature 1 discloses a lithium ion battery in which $SiO_x$ mixed with graphite is used as the negative electrode active material.

CITATION LIST

Patent Literature

Patent Literature 1: Japanese Unexamined Patent Application Publication No. 2011-233245

SUMMARY

In lithium ion batteries in which silicon particles are used as the negative electrode active material, improvement in the charge discharge cycle characteristics is desired.

Thus, an object of the present disclosure to provide a negative electrode active material for a lithium ion battery capable of preventing the deterioration in the charge/discharge cycle characteristics of lithium ion batteries in which silicon particles are used as the negative electrode active material and a lithium ion battery.

A negative electrode active material for a lithium ion battery as an aspect of the present disclosure has composite particles including a sodium silicate phase having a Vickers hardness of 150 Hv or more and silicon particles dispersed in the sodium silicate phase.

A lithium ion battery as an aspect of the present disclosure comprises a negative electrode having the negative electrode active material for a lithium ion battery described above, a positive electrode, and an electrolyte including a solvent and a lithium salt.

According to one aspect of the present disclosure, it is possible to prevent the deterioration in the charge/discharge cycle characteristics of lithium ion batteries in which silicon particles are used as the negative electrode active material.

BRIEF DESCRIPTION OF DRAWING

FIG. 1 is a sectional view schematically illustrating a particle of the negative electrode active material as an exemplary embodiment.

DESCRIPTION OF EMBODIMENTS

In the case where silicon particles are used as the negative electrode active material, the following reaction occurs during charge/discharge of a battery.

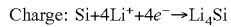

Charge: $Si+4Li^++4e^-\rightarrow Li_4Si$

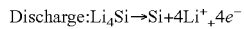

Discharge: $Li_4Si\rightarrow Si+4Li^++4e^-$

Usually, silicon particles have a large volume change in association with the above charge/discharge reaction. Thus, when charge/discharge cycles are repeated, the particle structure is broken to result in the deterioration in the charge/discharge cycle characteristics of the battery. The present inventors thus have intensively studied to find that dispersion of silicon particles in a sodium silicate phase having a hardness equal to or higher than a predetermined hardness can suppress a volume change in the silicon particles associated with a charge, discharge reaction to prevent the breakage of the particle structure, having conceived of a negative electrode active material for a lithium ion battery of the aspect described below.

A negative electrode active material for a lithium ion battery as an aspect of the present disclosure has composite particles including a sodium silicate phase having a Vickers hardness of 150 Hv or more and silicon particles dispersed in the sodium silicate phase. Dispersion of the silicon particles in the sodium silicate phase having a Vickers hardness of 150 Hv or more reduces a volume change in the silicon particles associated with the charge/discharge reaction to thereby prevent the breakage of the particle structure. The sodium silicate phase has low reactivity with lithium ions and exhibits satisfactory lithium ionic conductive property. Thus, the volume change in the sodium silicate phase itself is small, and lithium ions are conceived to migrate relatively smoothly in the sodium silicate phase. For these reasons, it is conceived that use of the negative electrode active material for a lithium ion battery, which is one aspect of the present disclosure, prevents the deterioration in the charge/discharge cycle characteristics of the battery.

Hereinafter, one example of the embodiment will be described in detail. The drawing referred to in the description of the embodiment is drawn schematically, and the dimensional ratio of the constituents drawn in the drawing may be different from that of the actual constituents, Specific dimensional ratios and the like should be determined in consideration of the following description.

A lithium ion battery as one example of the embodiment comprises a negative electrode including the negative electrode active material described above, a positive electrode, and a non-aqueous electrolyte. A separator is preferably provided between the positive electrode and the negative electrode. One exemplary structure of the lithium ion battery includes a structure in which an electrode assembly formed by winding a positive electrode and negative electrode via a separator and an electrolyte are accommodated in an exterior member. Alternatively, instead of the wound-type electrode assembly, an electrode assembly in a different form may be used, such as a layered electrode assembly in which a positive electrode and a negative electrode are layered via a separator. The lithium ion battery may be in any form, such as a cylindrical, rectangular, coin-shaped, button-shaped, or laminate form.

[Positive Electrode]

The positive electrode is preferably composed of, for example, a positive electrode current collector made of a metal foil or the like, and a positive electrode mixture layer formed on the current collector. As the positive electrode current collector, it is possible to use a foil of a metal stable in the potential range of the positive electrode, such as aluminum, a film including such a metal disposed on the surface layer thereof, or the like. The positive electrode mixture layer preferably includes a conductive agent and a binder, in addition to the positive electrode active material. The particle surface of the positive, electrode active material may be coated with particulates of an inorganic compound, for example, an oxide such as aluminum oxide ($Al_2O_3$) or the like, a phosphate compound, a borate compound, or the like.

Examples of the positive electrode active material include lithium transition metal oxides, which contain a transition metal element such as Co, Mn, and Ni. The lithium transition metal oxide is, for example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, or $Li_2MPO_4F$ (M is at least one of the group consisting of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). One of these lithium transition metal oxides may be used singly, or a plurality of these may be used in admixture.

Examples of conductive agents include carbon materials such as carbon black, acetylene black, Ketjen black, and graphite. One of these may be used singly, or two or more of these may be used in combination.

Examples of binders include fluorine-based resins such as polytetrafluoroethylene (PTFE) and polyvinylidene fluoride (PVdF), polyacrylonitrile (PAN) polyimide-based resins, acrylic resins and polyolefinic resins. These resins may be combined with carboxymethyl cellulose (CMC) or a salt thereof (e.g., CMC—Na, CMC—K, or CMC—$NH_4$ which may be a partially neutralized salt), polyethylene oxide (PEO), or the like. One of these may be used singly, or two or more of these may be used in combination.

[Negative Electrode]

The negative electrode is preferably composed of, for example, a negative electrode current collector made of a metal foil or the like and a negative electrode mixture layer formed on the current collector. As the negative electrode current collector, it is possible to use a foil of a metal stable in the potential range of the negative electrode, such as copper, a film including such a metal disposed on the surface layer thereof, or the like. The negative electrode mixture layer preferably includes a binder, in addition to the negative electrode active material. As the binder, a fluorine resin, PAN, a polyimide-based resin, an acrylic resin, a polyolefinic resin, or the like can be used as in the case of the positive electrode. When a mixture slurry is prepared using an aqueous solvent, CMC or a salt thereof (e.g., CMC—Na, CMC—K, or CMC—$NH_4$ may be a partially neutralized salt), styrene-butadiene rubber (SBR), polyacrylic acid (PAA) or a salt thereof (e.g., PAA-Na or PAA-K may be a partially neutralized salt), polyvinyl alcohol (PVA), or the like is preferably used.

FIG. 1 shows a sectional view of a particle of the negative electrode active material as an exemplary embodiment. The negative electrode active material particle 10 shown in FIG. 1 comprises a composite particle 13 including a sodium silicate phase 11 and silicon particles 12 dispersed in the sodium silicate phase 11. The negative electrode active material particle 10 shown in FIG. 1 preferably has a conductive layer 14 formed on the surface of the composite particle 13.

The composite particle 13 may include a third component besides the sodium silicate phase 11 and the silicon particles 12. Examples of the third component include $SiO_2$ as a natural oxidized film formed on the surface of the silicon particles 12, other elements, compounds, and inevitable impurities. The lithium silicate phase is, for example, a lithium silicate represented by $Li_{2z}SiO_{(2+z)}$ ($0<z<2$) or the like and specifically $Li_2SiO_3$ (Z=1), $Li_2Si_2O_5$ (Z=½) or the like. The content of $SiO_2$ in the natural oxidized film formed on the surface of the silicon particles 12 is preferably less than 10% by mass, more preferably less than 7% by mass based on the total amount of the negative electrode active material particle 10.

Since the silicon particles 12 can intercalate a larger number of lithium ions than a carbon material such as graphite, use of the silicon particles 12 contributes to a higher battery capacity.

The content of the silicon particles 12 is, from the viewpoint of a higher capacity an improvement in cycle characteristics, and the like, preferably 20% by mass to 95% by mass, more preferably 35% by mass to 75% by mass based on the total mass of the composite particle 13. When the content of the silicon particles 12 is excessively low, for example, the charge/discharge capacity may decrease. Additionally, the load characteristics may decrease due to insufficient dispersion of lithium ions. When the content of the silicon particles 12 is excessively high, for example, the effect of preventing the deterioration in the charge/discharge cycle characteristics may be reduced.

The average particle size of the silicon particles 12 is, for example, before the initial charge, 500 nm or less, preferably 200 nm or less, more preferably 50 nm or less. After the initial charge, the average particle size is preferably 400 nm or less, more preferably 100 nm or less. A volume change during charge/discharge decreases and cracking of the active material particles is more likely to be prevented by setting the average particle size of the silicon particles 12 within the range described above. The average particle size of the silicon particles 12 can be measured by observing a cross section of the negative electrode active material particle 10 using a scanning electron microscope (SEM) or a transmission electron microscope (TEM), and is specifically determined by converting the area of each of 100 silicon particles 12 to its equivalent circle diameter and averaging the diameters.

The Vickers hardness of the sodium silicate phase 11 is 150 Hv or more, preferably 300 Hv or more. When the Vickers hardness of the sodium silicate phase 11 is less than 150 Hv, the volume change of the silicon particles associated with the charge/discharge reaction is not reduced, and the deterioration in the charge/discharge cycle characteristics of the battery is not prevented. The upper limit of the Vickers hardness of the sodium silicate phase 11 is preferably 800 Hv or less. When the Vickers hardness of the sodium silicate phase 11 exceeds 800 Hv, in comparison with the case of 800 Hv or less, the amount of sodium decreases. Then, the lithium ionic conductive property of the sodium silicate phase 11 is degraded, and the effect of preventing the deterioration in the charge/discharge cycle characteristics of the battery may be reduced.

The Vickers hardness of the sodium silicate phase 11 can be measured as follows. The sodium silicate phase 11 in the form of a block before pulverization is embedded in a thermosetting resin, and the resin is abraded with No. 400 abrasive paper to expose a cross section of the sodium silicate phase 11. The cross section is mirror-finished further using No. 2000 abrasive paper and buffing. The sodium silicate phase 11, which may be dissolved in water, is abraded without water. The Vickers hardness of the cross section after abrasion is measured using a Vickers hardness meter under a load of 1 kg for a retention time of 15 seconds.

The sodium silicate constituting the sodium silicate phase 11 may have any composition as long as a Vickers hardness of 150 Hv or more can be achieved. In respect that reduction in the charge/discharge cycle characteristics can be further prevented, a sodium silicate represented by $Na_2O \cdot XSiO_2 \{1 \leq X \leq 9\}$ is preferably included. When X is less than 1 in $Na_2O \cdot XSiO_2$, the proportion of sodium in the sodium silicate becomes excessively high. Then, the hygroscopicity increases, and thus, it becomes difficult to form a sodium silicate phase 11 having a Vickers hardness of 150 Hv or more. In contrast, when X exceeds 9 in $Na_2O \cdot XSiO_2$, the proportion of sodium in the sodium silicate is excessively low and, for example, the lithium ionic conductive property of the sodium silicate phase 11 may decrease. That is, in both the case where X is less than 1 and the case where X is more than 9 in $Na_2O \cdot XSiO_2$, in comparison with the case where X is in the range of 1 to 9, the effect of preventing the deterioration in the charge/discharge cycle characteristics of the battery may be reduced.

The content of the sodium silicate represented by $Na_2O \cdot XSiO_2$ $\{1 \leq X \leq 9\}$ is preferably 50% by mass or more, more preferably 80% by mass or more based on the total mass of the sodium silicate phase 11, in respect of further preventing the deterioration in the charge/discharge cycle characteristics of the battery.

The silicon particles 12 are preferably composed of an assembly fine particles. The sodium silicate phase 11 exhibits a form in which silicon and sodium are linked via oxygen in a three- or two-dimensional state, which may be a crystal state, an amorphous state, or a mixture thereof.

Quantification of each of the elements (Na and Si) in the sodium silicate phase 11 can be estimated using inductively coupled plasma atomic emission spectroscopy (ICP-AES) by the following method.

First, a sample of the sodium silicate phase 11 is entirely dissolved in a heated acid solution (mixed acid of hydrofluoric acid, nitric acid, and sulfuric acid). After carbon as the dissolution residue is removed by filtration, the obtained filtrate is analyzed by ICP-AES to measure the spectral intensity of each metal element. Commercially available standard solutions of metal elements are used to prepare calibration curves, and the content of each metal element contained in the sodium silicate phase 11 is calculated.

The content of the sodium silicate phase 11 is preferably 5% by mass to 80% by mass, more preferably 25% by mass to 65% by mass based on the total mass of the composite particle 13, from the viewpoint of an improvement in cycle characteristics and the like.

The average particle size of the composite particles 13 is, for example, preferably in the range of 3 to 20 μm, more preferably in the range of 5 to 10 μm. Here, the average particle size of the composite particles 13 means a particle size at which the cumulative volume value is 50% in the particle diameter distribution (volume average particle size), as measured by a laser diffraction scattering method (using, e.g., "LA-750" manufactured by HORIBA, Ltd.). When the average particle size of the composite particles 13 is less than 3 μm or more than 20 μm, in comparison with the case where the above range is satisfied, the effect of preventing the deterioration in the charge/discharge cycle characteristics may be reduced. Similarly in the case of the negative electrode active material particles 10, in which the conductive layer 14 is formed on the surface of the composite particle 13, the average particle size of the negative electrode active material particles 10 is preferably in the range of 3 to 20 μm, more preferably in the range of 5 to 10 μm.

The BET specific surface area of the composite particle 13 is, for example, preferably 3 $m^2/g$ or less, more preferably in the range of 0.5 to 3 $m^2/g$. The BET specific surface area is a value measured in accordance with the BET method described in JIS R1626 (nitrogen adsorption method). When the BET specific surface area of the composite particle 13 exceeds 3 $m^2/g$, in comparison with the case where the above range is satisfied, the effect of preventing the deterioration in the charge/discharge cycle characteristics may be reduced. Similarly in the case of the negative electrode active material particles 10, in which the conductive layer 14 is formed on the surface of the composite particle 13, the BET specific surface area of the negative electrode active material particle 10 is preferably 3 $m^2/g$ or less, more preferably in the range of 0.5 to 3 $m^2/g$.

As the negative electrode active material for a lithium ion battery, only the composite particle 13 or only the negative electrode active material particles 10, in which the conductive layer 14 is formed on the surface of the composite particle 13, may be used singly, or other active materials may be used in combination. As other active materials, preferable is a carbon material such as graphite. In the case where a carbon material is used in combination, the proportion between the composite particle 13 or the negative electrode active material particle 10 and the carbon material is preferably 99:1 to 70:30 in terms of mass ratio, in respect of a higher capacity, an improvement in charge/discharge cycle characteristics, and the like.

The composite particles 13 are produced via the following steps 1 to 4, for example. All of the following steps are preferably conducted in an inert atmosphere, but the step 1 can be conducted in an air atmosphere.

(1) A mixture obtained by fixing a Na raw material and a Si raw material in predetermined amounts is hot-melted, and the melt was allowed to pass through a metal roller to produce a flaked sodium silicate. The flaked sodium silicate may be heat-treated and crystallized in an air atmosphere at a temperature equal to or higher than the glass transition point and equal to and lower than the melting point. Alternatively, a sodium silicate may be produced by means of a solid phase reaction by firing a mixture prepared by mixing the raw materials in predetermined amounts at a temperature equal to or lower than the crystal melting point, without being subjected to hot-melting. Examples of the Na raw material include sodium oxide, sodium carbonate, and sodium hydroxide. Examples of the Si raw material include silicon oxide. Contamination of the sodium silicate by impurity metals other than sodium (e.g. lithium, potassium, and calcium) is desirably avoided, but in the case of contamination b inevitable impurity metals, it is preferable to suppress the content thereof to about 3 mol % or less.

(2) A sodium silicate powder obtained by pulverizing the sodium silicate described above to an average particle size of about several μm to several ten μm and a Si powder having an average particle size of about several μm to several ten μm are mixed at a weight ratio of 5:95 to 80:20, for example, to produce a mixture.

(3) Then, the mixture described above is pulverized into particulates using a ball mill. The mixture also can be produced after each of the raw material powder is particulated.

(4) The pulverized mixture is heat-treated at 600 to 1000° C. for example. In this heat treatment, a sintered compact of the mixture may be prepared by application of a pressure as in hot pressing. Alternatively, without use of a ball mill, the Si powder and the silicate powder may be mixed and heat-treated. Through these steps, the composite particles 13 can be produced.

The conductive material constituting the conductive layer 14 is preferably one having electrochemical stability, and preferably at least one selected from the group consisting of carbon materials, metals, and metal compounds. As the carbon material, similarly as for the conductive agent of the positive electrode mixture layer, carbon black, acetylene black, Ketjen black, graphite, or a mixture of two or more of these can be used. As the metal, it is possible to use copper, nickel, and alloys thereof, which are stable in the potential range of the negative electrode. Examples of the metal compound include copper compounds and nickel compounds (a layer of the metal or metal compound can be formed on the surface of the composite particles 13, for example, by electroless plating). Of these, use of the carbon material is particularly preferable.

Examples of a method for coating the surface of the composite particles 13 with the carbon material include a CVD method using acetylene, methane, or the like and a method in which coal pitch, petroleum pitch, phenol resin, or the like is mixed with the composite particles 13 and the mixture is heat-treated. Alternatively, carbon black, Ketjen black, or the like may be affixed to the surface of the composite particles 13 using a binder, The conductive layer 14 preferably covers the substantially entire surface of the composite particles 13. The thickness of the conductive layer 14 is preferably 1 to 200 nm, more preferably 5 to 100 urn, in consideration of achievement of the electrical conductivity and diffusion of lithium ions to the composite particles 13. When the thickness of the conductive layer 14 becomes excessively smaller, the electrical conductivity decreases, and it becomes difficult to uniformly coat the composite particles 13. In contrast, when the thickness of the conductive layer 14 becomes excessively larger, diffusion of lithium ions to the composite particles 13 is prevented, and thus the capacity tends to decrease. The thickness of the conductive layer 14 can be measured try means of observation on the cross section of the particles using a SEM or TEM.

[Electrolyte]

The electrolyte includes a solvent and an electrolyte salt dissolved in the solvent. The electrolyte is not limited to a liquid electrolyte and may be a solid electrolyte for which a gel-like polymer or the like is used. As the solvent, it is possible to use a non-aqueous solvent or an aqueous solvent comprising, for example, esters, ethers, nitriles such as acetonitrile, amides such as dimethylformamide, and mixed solvents of two or more of these. The non-aqueous solvent may contain a halogen-substituted product obtained by substituting at least a portion of the hydrogen of the solvent by halogen atoms such as fluorine.

Examples of the esters described above include cyclic carbonates such as ethylene carbonate (EC), propylene carbonate (PC), and butylene carbonate, chain carbonates such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylates such as γ-butyrolactone (GBL) and γ-valerolactone (GVL), and chain carboxylates such as methyl acetate, ethyl acetate, propyl acetate, methyl propionate (MP), ethyl propionate, and γ-butyrolactone.

Examples of the ethers described above include cyclic ethers such as 1,3-dioxolane 4-methyl-1,3-dioxolane, tetrahydrofuran, 2-methyl tetrahydrofuran, propylene oxide, 1,2-butylene oxide, 1,3-dioxane, 1,4-dioxane, 1,3,5-trioxane, furan, 2-methyl luau, 1,8-cineol, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane. 1,1-diethoxyethane, triethylene glycol dimethyl ether, and tetraethylene glycol dimethyl ether.

As the halogen-substituted product described above, a fluorinated cyclic carbonate such as fluoroethylene carbonate (FEC), a fluorinated chain carbonate, a fluorinated chain carboxylate such as methyl fluoropropionate (FMP), or the like is preferably used.

As the electrolyte salt, a lithium salt is used. Examples of the lithium salt include $LiBF_4$, $LiClO_4$, $LiPF_6$. $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroborane lithium, lithium lower aliphatic carboxylate borates such as $Li_2B_4O_7$ and $Li(B(C_2O_4)F_2)$ and imide salts such as $LiN(SO_2CF_3)_2$ and $LiN(C_1F_{2l+1}SO_2)(C_mF_{2m+1}SO_2)$ {1 and m are each an integer of 0 or more}. One of these lithium salts may be used singly, or a plurality of these may be used in admixture. Of these, $LiPF_6$ is preferably used from the viewpoint of the ionic conductive property, electrochemical stability, and the like. The concentration of the lithium salt is preferably 0.8 to 1.8 mol per 1 L of the non-aqueous solvent.

[Separator]

As the separator, for example, a porous sheet having ion permeability and insulation is preferably used. Specific examples of the porous sheet include microporons thin films, woven fabric, and non-woven fabric. As materials for the separator, olefin resins such as polyethylene and polypropylene, cellulose, and the like are suitable. The separator may be a laminate having a cellulosic fiber layer and a layer of a thermoplastic resin fiber such as an olefinic resin.

EXAMPLES

Hereinbelow, the present disclosure will be further described with reference to examples, but the present disclosure is not intended to be limited to these examples.

Example 1

[Production of Negative Electrode Active Material]

50 mol % sodium carbonate and 50 mol % silicon oxide ($SiO_2$) were mixed. This mixture was allowed to melt in an inert atmosphere at 1200° C., for 5 hours, and the melt was allowed to pass through a metal roller to produce a sodium silicate in the form of flakes. The Vickers hardness of the sodium silicate was 300 Hv. The sodium silicate is a sodium silicate represented by $Na_2O \cdot XSiO_2$ {X=1}, in which the proportion of $Na_2O$ is 50 mol % and the proportion of $SiO_2$ is 50 mol %.

The sodium silicate was pulverized until the average particle size was reached 10 μm to obtain a sodium silicate powder. Then, the Si powder (3 N, 10 μm pulverized product) and the silicate powder were mixed at a mass ratio of 42:58 in an inert atmosphere, and a pot (made of SUS, capacity: 500 mL) of a planetary ball mill (manufactured by Fritsch Co. Ltd., P-5) was filled with the mixture. To the pot, 24 balls made of SUS (diameter: 20 mm) were placed and the lid was closed. A pulverization treatment was conducted at 200 rpm for 25 hours. Thereafter, the powder was taken out in an inert atmosphere and subjected to a heat treatment under a temperature condition of 600° C. in an inert atmosphere for 4 hours. The heat-treated powder (hereinbelow, referred to as composite particles) was pulverized, allowed to pass through 40 μm mesh, and then mixed with coal pitch (manufactured by JFE Chemical Corporation, MCP250). The mixture was heat-treated in an inert atmosphere at 800° C. for 5 hours to coat the surface of the composite particles with carbon to thereby form a conductive layer. The amount of carbon coating is 5% by mass based on the total mass of particles including the composite particles and the conductive layer. Thereafter, an Elbow-Jet classifier was used to obtain a negative electrode active material having an average particle size adjusted to 10 μm. The BET specific surface area of the negative electrode active material was 1 m$^2$/g.
[Analysis on Negative Electrode Active Material]

As a result of observation on a particle cross section of the negative electrode active material with a SEM, it was confirmed that Si particles were substantially uniformly dispersed in a matrix comprising the sodium silicate. In the XRD pattern of the negative electrode active material, peaks derived from Si and the sodium silicate were confirmed.
[Production of Negative Electrode]

Subsequently, the above-described negative electrode active material and polyacrylonitrile (PAN) were mixed at a mass ratio of 95:5, and N-methyl-2-pyrrolidone (NMP) was added to the mixture. The mixture was stirred using a mixer (manufactured by THINKY CORPORATION, Awatori Rentaro) to prepare a negative electrode mixture slurry. Then, the slurry was coated on one surface of copper foil such that the mass per 1 m$^2$ of a negative electrode mixture layer was 25 g. The coated film was dried in the atmosphere at 105° C. and then rolled to produce a negative electrode. The packing, density of the negative electrode mixture layer was set to 1.50 g/cm$^3$.
[Preparation of Non-aqueous Liquid Electrolyte]

To a mixed solvent obtained by mixing ethylene carbonate (EC) and diethyl carbonate (DEC) at a volume ratio of 3:7, LiPF$_6$ was added so that the concentration thereof reached 1.0 mol/L to prepare a non-aqueous liquid electrolyte.
[Production of Lithium Ion Battery]

In an inert atmosphere, the above-described negative electrode and a lithium metal foil, to each of which a Ni tab was attached, were disposed opposite to each other via a separator made of polyethylene to form an electrode assembly. The electrode assembly was introduced into a battery exterior member composed of an aluminum laminate film, the non-aqueous liquid electrolyte was poured into the battery exterior member, and the battery exterior member was sealed to produce a battery.

Example 2

A sodium silicate was produced in the same manner as in Example 1 except that 33.3 mol % sodium carbonate and 66.6 mol % silicon oxide (SiO$_2$) were mixed and this mixture was melted in an inert atmosphere at 1200° C. for 5 hours. The Vickers hardness of the sodium silicate was 310 Hv. The sodium silicate, which has a proportion of Na$_2$O of 33.3 mol % and a proportion of SiO$_2$ of 66.6 mol %, is a sodium silicate represented by Na$_2$O·XSiO$_2${X=2}.

A battery was produced in the same manner as in Example 1 except that the above-described sodium silicate was used and a negative electrode active material was obtained of which average particle size was adjusted to 1 μm using an Elbow-Jet classifier. The BET specific surface area of the negative electrode active material of Example 2 was 8 m$^2$/g.

Example 3

A battery was produced in the same manner as in Example 1 except that the sodium silicate of Examples 2 was used and a negative electrode active material was obtained of which average particle size was adjusted to 3 μm using an Elbow-Jet classifier. The BET specific surface area of the negative electrode active material of Example 3 was 3 m$^2$/g.

Example 4

A battery was produced in the same manner as in Example 1 except that the sodium silicate of Example 2 was used and a negative electrode active material was obtained of which average particle size was adjusted to 5 μm using an Elbow-Jet classifier. The BET specific surface area of the negative electrode active material of Example 4 was 2 m$^2$/g.

Example 5

A battery was produced in the same manner as in Example 1 except that the sodium silicate of Example 2 was used and a negative electrode active material was obtained of which average particle size was adjusted to 10 μm using an Elbow-Jet classifier. The BET specific surface area of the negative electrode active material of Example 5 was 1 m$^2$/g.

Example 6

A battery was produced in the same manner as in Example 1 except that the sodium silicate of Example 2 was used and a negative electrode active material was obtained of which average particle size was adjusted to 20 μm using an Elbow-Jet classifier. The BET specific surface area of the negative electrode active material of Example 6 was 0.5 m$^2$/g.

Example 7

A battery was produced in the same manner as in Example 1 except that the sodium silicate of Example 2 was used and a negative electrode active material was obtained of which average particle size was adjusted to 30 μm using an Elbow-Jet classifier. The BET specific surface area of the negative electrode active material of Example 7 was 0.3 m$^2$/g.

Example 8

A sodium silicate was produced in the same manner as in Example 1 except that 20 mol % sodium carbonate and 80 mol % silicon oxide (SiO$_2$) were mixed and this mixture was melted in an inert atmosphere at 1500° C. for 5 hours. The Vickers hardness of the sodium silicate was 350 Hv. The sodium silicate is a sodium silicate represented by Na$_2$O·XSiO$_2${X=4}, in which the proportion of Na$_2$O is 20 mol % and the proportion of SiO$_2$ is 80 mol %.

A battery was produced in the same manner, as in Example 1 except that the above-described sodium silicate was used.

Example 9

A sodium silicate was produced in the same manner as in Example 1 except that 10 mol % sodium carbonate and 90 mol % silicon oxide (SiO$_2$) were mixed and this mixture was incited in an inert atmosphere at 1600° C. for 5 hours. The Vickers hardness of the sodium silicate was 400 Hv. The sodium silicate is a sodium silicate represented by Na$_2$O·XSiO$_2$ {X=9}, in which the proportion of Na$_2$O is 10 mol % and the proportion of SiO$_2$ is 90 mol %.

A battery was produced in the same Trimmer as in Example 1 except that the above-described sodium silicate was used.

Example 10

A sodium silicate was produced in the same manner as in Example 1 except that 5 mol % sodium carbonate and 95 mol % silicon oxide ($SiO_2$) were mixed and this mixture was incited in an inert atmosphere at 1700° C. for 5 hours. The Vickers hardness of the sodium silicate was 500 Hv. The sodium silicate is a sodium silicate represented by $Na_2O \cdot XSiO_2$ {X=19}, in which the proportion of $Na_2O$ is 5 mol % and the proportion of $SiO_2$ is 95 mol %.

Example 11

A sodium silicate was produced in the same manner as in Example 1 except that 4 mol % sodium carbonate and 96 mol % silicon oxide ($SiO_2$) were mixed and this mixture was incited in an inert atmosphere at 1700° C. for 5 hours. The Vickers hardness of the sodium silicate was 800 Hv. The sodium silicate is a sodium silicate represented by $Na_2O \cdot XSiO_2$ {X=24}, in which the proportion of $Na_2O$ is 4 mol % and the proportion of $SiO_2$ is 96 mol %.

Comparative Example 1

A sodium silicate was produced in the same manner as in Example 1 except that 80 mol % sodium carbonate and 20 mol % silicon oxide ($SiO_2$) were mixed and this mixture was incited in an inert atmosphere at 1000° C. for 5 hours. The Vickers hardness of the sodium silicate was less than 150 Hv. The sodium silicate is a sodium silicate represented by $Na_2O \cdot XSiO_2${X=25}, in which the proportion of $Na_2O$ is 80 mol % and the proportion of $SiO_2$ is 20 mol %.

A battery was produced in the same manner as in Example 1 except that the above-described sodium silicate was used.

Comparative Example 2

A sodium silicate was produced in the same manner as in Example 1 except that 66.6 mol % sodium carbonate and 33.3 mol % silicon oxide ($SiO_2$) were mixed and this mixture was melted in an inert atmosphere at 1000° C. for 5 hours. The Vickers hardness of the sodium silicate was less than 150 Hv. The sodium silicate is a sodium silicate represented by $Na_2O \cdot XSiO_2$ {X=0.5}, in which the proportion of $Na_2O$ is 66.6 mol % and the proportion of $SiO_2$ is 33.3 mol %.

A battery was produced in the same manner as in Example 1 except that the above-described sodium silicate was used.

[Charge/Discharge Cycle Test]

The batteries of Examples and Comparative Examples were subjected to a charge/discharge cycle test by the following method.

After charge was conducted at a current of 1 it until the voltage reached 0 V, discharge was conducted at a current of 1.0 It until the voltage reached 1.0 V. 300 cycles of the charge/discharge described above were conducted. Then, the capacity retention was calculated by the following expression. A higher capacity retention indicates that the deterioration in the charge/discharge cycle characteristics is further prevented. capacity retention (%)=(discharge capacity in 300th cycle/discharge capacity of first cycle)×100.

The results of the capacity retention of each of Examples and Comparative Examples are shown in Table 1. The capacity retentions shown in Table 1 are the capacity retentions of other Examples indicated as relative values with respect to the capacity retention of Example 10 taken as the reference (100).

TABLE 1

| | Sodium silicate phase $Na_2O \cdot XSiO_2$ | | | | Negative electrode active material | | |
|---|---|---|---|---|---|---|---|
| | X | $Na_2O$ (mol %) | $SiO_2$ (mol %) | Vickers hardness (Hv) | Average particle size (μm) | BETspecific surface area (g/m²) | Capacity retention |
| Example | | | | | | | |
| 1 | 1 | 50.0 | 50.0 | 300 | 10 | 1 | 120 |
| 2 | 2 | 33.3 | 66.6 | 310 | 1 | 8 | 105 |
| 3 | 2 | 33.3 | 66.6 | 310 | 3 | 3 | 115 |
| 4 | 2 | 33.3 | 66.6 | 310 | 5 | 2 | 118 |
| 5 | 2 | 33.3 | 66.6 | 310 | 10 | 1 | 120 |
| 6 | 2 | 33.3 | 66.6 | 310 | 20 | 0.5 | 115 |
| 7 | 2 | 33.3 | 66.6 | 310 | 30 | 0.3 | 107 |
| 8 | 4 | 20 | 80.0 | 350 | 10 | 1 | 119 |
| 9 | 9 | 10 | 90.0 | 400 | 10 | 1 | 115 |
| 10 | 19 | 5 | 95.0 | 500 | 10 | 1 | 100 |
| 11 | 24 | 4 | 96.0 | 800 | 10 | 1 | 102 |
| Comparative Example | | | | | | | |
| 1 | 0.25 | 80 | 20 | <150 | 10 | 1 | — |
| 2 | 0.5 | 66.6 | 33.3 | <150 | 10 | 1 | — |

The sodium silicate phase of each of Comparative Examples 1 and 2 includes a sodium silicate represented by $Na_2O \cdot XSiO_2${≤X}, and has a Vickers hardness of less than 150 Hv. Such a sodium silicate phase has very high hygroscopicity. Thus, the composite particles including silicon particles dispersed in the sodium silicate phase did not function as the negative electrode active material, and it was not possible to conduct the charge/discharge, cycle test of the batteries.

The sodium silicate phase of each of Examples 1 to 11 includes a sodium silicate, represented by $Na_2O \cdot XSiO_2$ {1≤X} and has a Vickers hardness of 150 Hv or more. In the composite particles including such a sodium silicate phase and silicon particles dispersed in the sodium silicate phase, the breakage of the particles in the charge/discharge cycles was prevented and tire deterioration in the charge/discharge cycle characteristics was prevented, in comparison with the case where silicon particles were singly used as the negative electrode active material.

Among Examples 1 to 11, the deterioration in the charge/discharge cycle characteristics was further prevented in Examples 1 to 9, in which the sodium silicate phase including a sodium silicate represented by $Na_2O \cdot XSiO_2$ $\{1 \leq X \leq 9\}$ was used, in comparison with Examples 10 and 11, in which the sodium silicate phase including a sodium silicate represented by $Na_2O \cdot XSiO_2$ $\{9<X\}$ was used.

Additionally, among Examples 2 to 7, the deterioration in the charge/discharge cycle characteristics was further prevented in Examples 3 to 7, in which the BET specific surface area of the negative electrode active material was 3 $m^2/g$ or less, and preferably in Examples 3 to 6, in which the BET specific surface area of the negative electrode active material is in the range of 0.5 to 3 $m^2/g$, in comparison with Examples 2, in which the BET specific surface area of the negative electrode active material was more than 3 $m^2/g$.

Additionally, among Examples 2 to 7, the deterioration in the charge/discharge cycle characteristics was further prevented in Examples 3 to 7, in which the BET specific surface area of the negative electrode active material was 3 $g/m^2$ or less, and preferably in Examples 3 to 6, in which the BET specific surface area of the negative electrode active material is in the range of 0.5 to 3 $g/m^2$, in comparison with Examples 2, in which the BET specific surface area of the negative electrode active material was more than 3 $g/m^2$.

REFERENCE SIGNS LIST

10 negative electrode active material particle
11 sodium silicate phase
12 silicon particle
13 composite particle
14 conductive layer

The invention claimed is:

1. A negative electrode active material for a lithium ion battery having composite particles, the composite particles including:
   a sodium silicate phase having a Vickers hardness of 150 Hv or more; and
   silicon particles dispersed in the sodium silicate phase,
   wherein a BET specific surface area of the composite particles is 3 $m^2/g$ or less, and
   wherein the sodium silicate phase has a Vickers hardness of 400 Hv or less.

2. The negative electrode active material for a lithium ion battery according to claim 1, wherein the sodium silicate phase includes a sodium silicate represented by $Na_2O \cdot XSiO_2$ $\{1 \leq X \leq 9\}$.

3. The negative electrode active material for a lithium ion battery according to claim 1, wherein an average particle size of the composite particles is in a range of 3 μm to 20 μm.

4. A lithium ion battery comprising:
   a negative electrode having the negative electrode active material for a lithium ion battery according to claim 1;
   a positive electrode; and
   an electrolyte including a solvent and a lithium salt.

* * * * *